United States Patent [19]

Doskocil et al.

[11] Patent Number: 4,862,636

[45] Date of Patent: Sep. 5, 1989

[54] HAND-HELD TROTLINE HOLDER

[75] Inventors: Benjamin L. Doskocil; Douglas J. Sharp, both of Arlington, Tex.

[73] Assignee: Doskocil Manufacturing Co., Inc., Arlington, Tex.

[21] Appl. No.: 83,233

[22] Filed: Aug. 5, 1987

[51] Int. Cl.$^4$ ..................... B65H 75/40; A01K 97/00
[52] U.S. Cl. ......................................... 43/57.3; 242/96
[58] Field of Search ...................... 43/57.3, 27.2, 27.4; 242/96, 84.2 J

[56] References Cited

U.S. PATENT DOCUMENTS

| 921,902 | 5/1909 | Smith | 43/57.3 |
|---|---|---|---|
| 1,221,904 | 4/1917 | Potier | 43/57.3 |
| 1,405,546 | 2/1922 | Nelson | 43/57.3 |
| 1,768,981 | 7/1930 | Henrikson | 43/57.3 |
| 1,997,243 | 4/1935 | Vanderhider et al. | 43/57.3 |
| 2,158,947 | 5/1939 | Purdum | 43/57.3 |

(List continued on next page.)

FOREIGN PATENT DOCUMENTS 876785  7/1949  Fed. Rep. of Germany ........ 242/96

Primary Examiner—Kurt Rowan
Attorney, Agent, or Firm—Charles W. McHugh

[57] ABSTRACT

A hand-held trotline holder adapted for safety accumulating, storing, and dispensing a trotline having a main line with spaced drop lines carrying hooks. The trotline holder includes an arcuate handgrip and spool-like member that rotates with respect to the handgrip. The spool-like member comprises a hollow cylindrical hub with two circular flanges; one of those flanges is attached at each of the two ends of the hub. The trotline is accumulated around the hub and contained between the two flanges. The hub is adapted to rotate about its central (longitudinal) axis, and the two flanges (which are preferably formed integrally with the hub) therefore rotate in planes perpendicular to the hub's central axis. Rigidly affixed to the outer face of the first flange is a series of peripherally and outwardly opening compartments; each compartment has at least one radially extending slot for storing one or more hooks attached to the drop lines. The second flange has affixed thereto an external knob which is adapted to be grasped for turning the spool about its central axis.

Permanently mounted within the cylindrical spool hub is a handgrip which is adapted for rotatably supporting the spool. A portion of the handgrip acts as a guard or shield between the user's hand (which hand is supporting the spool) and the points and barbs of hooks that are captured within the compartments. The handgrip also preferably includes a structure which permits control of the rotation of the spool with respect to the handgrip. In one embodiment of the invention, a handgrip is configured so that the user's thumb may extend over the top of the handgrip for a short distance in order to bear against a portion of the spool in such a way as to inhibit rotation thereof. This is done by sizing the shield so that the end of the thumb may engage a side wall of one of the adjacent compartments (thereby preventing the compartment from rotating with respect to the user's hand). In another embodiment, a protuberance carried by a flexible portion of the handgrip may be moved to a position where it interferes with free rotation of the spool. By flexing the handgrip portion so as to force interference between the protuberance and one or more side walls of the compartments, rotation of the compartments about the central axis can be selectively retarded and/or prevented.

A typical embodiment of the invention will have first and second flanges about 10 inches in diameter, and will have some 23 compartments with associated slots, each of which may conveniently hold up to 5 or 6 substantial hooks. Such a holder can accommodate over 250 feet of main line and about 50 drop lines with their associated hooks. All of this can be accomplished with a holder that is relatively compact (i.e., capable of being placed in an envelope of about 165 cubic inches) and which will weigh only about 4½ pounds.

23 Claims, 4 Drawing Sheets

U.S. PATENT DOCUMENTS

| | | | |
|---|---|---|---|
| 2,242,509 | 5/1941 | Coalson | 43/57.3 |
| 2,531,643 | 11/1950 | Pringle | 43/57.3 |
| 2,531,816 | 11/1950 | Homoky | 43/57.3 |
| 2,629,197 | 2/1953 | Duvall | 43/57.3 |
| 2,633,661 | 4/1953 | Stevens et al. | 43/57.3 |
| 2,690,565 | 3/1954 | Platt | 43/57.3 |
| 2,708,326 | 5/1955 | Bleckman | 43/57.3 |
| 2,778,142 | 1/1957 | Berry | 43/57.3 |
| 3,006,574 | 10/1961 | Hardy | 242/96 |
| 3,022,601 | 2/1962 | Martin | 43/57.3 |
| 3,024,563 | 3/1962 | Meisetschlager | 43/57.3 |
| 3,029,545 | 4/1962 | Hess et al. | 43/57.3 |
| 3,047,978 | 8/1962 | Glover | 43/57.3 |
| 3,104,489 | 9/1963 | Ford | 43/57.3 |
| 3,466,785 | 9/1969 | Shook | 43/57.3 |
| 3,486,267 | 12/1969 | Hitre | 43/57.3 |
| 3,660,924 | 5/1972 | McGee, Jr. | 43/57.3 |
| 3,775,893 | 12/1973 | McGee, Jr. | 43/57.3 |
| 3,803,750 | 4/1974 | Nunley | 43/57.3 |
| 3,842,530 | 10/1974 | Jackson et al. | 43/57.3 |
| 3,945,144 | 3/1976 | Purselley | 43/57.3 |
| 4,091,559 | 5/1978 | Easley | 43/57.3 |
| 4,168,042 | 9/1979 | Joe et al. | 242/96 |
| 4,453,843 | 6/1984 | Martyniuk | 43/57.3 |
| 4,522,349 | 6/1985 | Clerk | 242/96 |
| 4,525,949 | 7/1985 | Pike et al. | 43/57.3 |
| 4,542,862 | 9/1985 | Romike et al. | 43/57.3 |
| 4,688,740 | 8/1987 | Weeks et al. | 242/96 |

HAND-HELD TROTLINE HOLDER

BACKGROUND OF THE INVENTION

This invention relates generally to trotline holders; more particularly, it relates to a holder which includes a spool that can be conveniently and efficiently managed when a trotline is being accumulated and dispensed, as well as when the spool and its stored hooks are simply being carried to and from a fishing site.

It is well known by people who fish that a trotline is useful in catching many kinds of fish. The standard construction of a trotline includes a main line (which often is 200 or more feet long) that is anchored at each of its two ends, and a plurality of drop lines which are attached to the main line at spaced locations along its length. Each of the drop lines or leaders has at least one hook attached to the free end. This permits a multitude of hooks to be simultaneously immersed in a lake, river or similar body of water where various baits may be offered to the fish that are present.

To use a trotline, it must first be set out along or extended across a river, lake or other body of water. One end of the trotline is typically secured to an anchoring point such as a tree or large rock on the shore, and the other end is typically secured to something that the fisherman can easily locate, which may be another tree, a rock or a bouyant member floating in a body of water. The trotline is generally suspended in such a way that the spaced drop lines hang freely from the tensioned main line. The hooks of the trotline can be baited during or after the primary installation process; once the hooks are baited, the person who is fishing can leave the trotline unattended and return later to see if any fish have been caught. If the first location proves to be unsatisfactory, the trotline may be retrieved and set out at a more appropriate location.

Unfortunately, trotlines are sometimes difficult to handle—because the hooks and drop lines tend to become tangled with each other and with the main line, and the points and barbs of 25 or more hooks constitute a potential threat to the unwary. Thus, setting out and retrieving a trotline can be rather bothersome and it is also sometimes risky—if no safe equipment is available to readily wind up and unwind the trotline. This is especially true in the case of hand-held trotline holders.

Of course, it is true that there have been devices which have been proposed from time to time for handling a trotline with some degree of safety and without a lot of the annoying entanglements between hooks, drop lines, and the main line. Some trotline holders have compartments to segregate hooks so as to prevent entanglement between individual hooks and the drop lines or main line. But to achieve this advantage such holders inherently had to limit their capacity; as a result, generally only one hook could be placed in each such compartment. Exemplary of this kind of device is the structure shown in U.S. Pat. No. 3,660,924 to Roger V. McGee, Jr.

Other devices of the prior art have a relatively large capacity for storing trotline, but their size—and weight—has generally dictated that they be supported by a bracket of some kind, because they would be awkward to handle with one or even two hands. They are generally characterized by a drum supported by a yoke or spindle which must be fixed to a sturdy structure such as a boat. Exemplary of this kind of a trotline holder is the one shown in U.S. Pat. No. 2,629,197 to James B. Duvall.

However, there are some trotline holders which are adapted to be hand-held, and one even provides a protective flange to shield the user's hand from multiple hooks stored on the holder—while the holder is being manipulated; this holder is shown in U.S. Pat. No. 4,542,862 to Robert C. Romike and Vernon H. Byrd. Unfortunately the protective flange shown in this patent is rigidly attached to the spool, and it restricts access to hooks held in the slots; so it may be difficult for a user to see all of the hooks while the trotline is being stored or dispensed.

The above-described devices have addressed the need for conveniently storing and handling trotline, but it seems they have done so at the expense of efficiency, ease of use, and safety. Some of the above-described devices require time-consuming assembly procedures while others are bulky, heavy, or difficult to use; others probably would be prohibitively expensive to produce because of the inordinate number of exotic parts that are required to build such a holder. Accordingly, there has remained a need for a truly reliable and simple hand-held device which is capable of conveniently accumulating and dispensing a trotline, but which does not sacrifice efficiency and ease of use. It is an object of this invention to provide such a device.

Another object is to provide a trotline holder having a very favorable relationship between its compact size and weight—in comparison with its substantial capacity for storing trotline.

It is a further object to provide a trotline holder that has a means for selectively inhibiting rotation of the spool while accumulating or dispensing trotline, so that a drop line and its associated hook may be safely loaded on or removed from the static holder.

One other object is to provide a compact trotline holder with no removable parts—so as to preclude the loss of any parts during routine transportation or while using the holder over a body of water, etc.

Still another object is to provide a hand-held trotline holder which may be used with equal convenience by both right- and left-handed people.

These and other objects will be apparent from a careful reading of the specification and the claims appended thereto, and from a review of the drawing attached hereto.

BRIEF DESCRIPTION OF THE INVENTION

In brief, the invention includes a hand-held trotline holder adapted for safely accumulating, storing, and dispensing a trotline having a main line with spaced drop lines carrying hooks. The trotline holder includes a handgrip and spool-shaped member that rotates with respect to the handgrip. The spool-shaped member comprises a hollow cylindrical hub with two circular flanges; one of those flanges is attached at each of the two ends of the hub. The trotline is accumulated around the hub and contained between the two flanges. The hub is adapted to rotate about its central (longitudinal) axis, and the two flanges (which are preferably formed integrally with the hub) therefore rotate in planes perpendicular to the hub's central axis. Affixed to the outer face of the first flange is a series of peripherally and outwardly opening compartments; each of the compartments has at least one radially extending slot for receiving one or more hooks attached to the drop lines. The second flange has affixed thereto an external knob which is adapted to be grasped for turning the spool with respect to the handgrip.

The handgrip is permanently mounted within the cylindrical hub and is adapted for rotatably supporting the spool. A portion of the handgrip acts as a guard or shield between the user's hand (which hand is supporting the spool) and the points and barbs of hooks that are captured within the compartments. The handgrip also preferably includes a structure which permits control of rotation of the spool with respect to the handgrip. In one embodiment of the invention, a handgrip is configured so that the user's thumb may extend over the top edge of the handgrip for a short distance in order to bear against a portion of the spool in such a way as to inhibit rotation thereof. This is done by sizing the shield so that the end of the thumb may engage a side wall of one of the adjacent compartments (thereby preventing the compartment from rotating with respect to the user's hand). In another embodiment, a protuberance carried by a flexible portion of the handgrip may be moved to a position where it interferes with free rotation of the spool and the compartments carried thereby. By flexing the handgrip portion inwardly so as to force interference with the side walls of the compartments, rotation of the spool about the central axis can be selectively retarded and/or prevented.

A preferred embodiment of the invention will have first and second flanges about 10 inches in diameter, and will have some 23 compartments with associated slots for conveniently holding up to 5 or 6 substantial hooks. Such a holder can accommodate over 250 feet of main line and about 50 drop lines with their associated hooks. All of this can be achieved in a holder that is relatively compact (e.g., occupying an envelope of about 165 cubic inches) and weighing less than 5 pounds when loaded with 250 feet of No. 72 twisted twine trotline and about fifty size 6/0 Eagle Claw "J" hooks.

DETAILED DESCRIPTION OF A PREFERRED EMBODIMENT OF THE INVENTION

Figure 1:
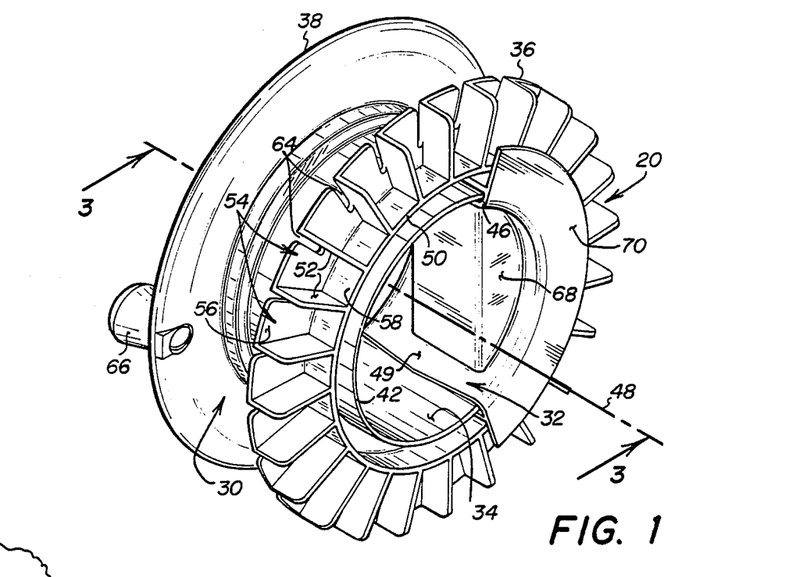
FIG. 1 is a perspective view of one embodiment of the invention illustrating a holder including a spool and handgrip for safely and efficiently accumulating and dispensing a trotline.
Figure 2:
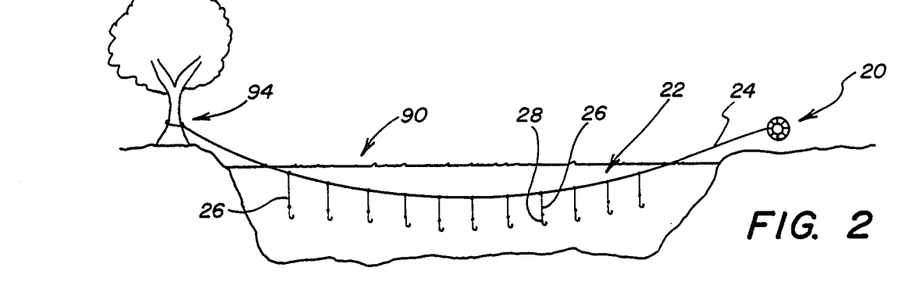
FIG. 2 is an elevational view illustrating the environment in which a trotline holder may be used, and showing how the trotline may be extended across a body of water such as a lake.

Referring initially to FIGS. 1 and 2, a holder 20 is shown for safely and efficiently accumulating and dispensing a trotline 22 having a main line 24 with spaced drop lines 26 carrying hooks 28. The holder 20 comprises a generally cylindrical spool 30 and handgrip 32. The spool 30 includes a hub 34 and two generally parallel flanges 36, 38 and is preferably molded as a single-piece construction. Of course, it may be manufactured in two or more pieces and assembled using any of a variety of joining methods including the use of screws, fasteners, adhesives or the like. The spool 30 is preferably molded from a semi-flexible polyolefin plastic or similar material which is light-weight for easy handling and impact-resistant for strength and resilience—to prevent the spool from breaking if it should be accidently dropped on a hard surface. A suitable material is a high density polyethylene available from USI Chemical of Chicago Ill. under the notation of Norchem NHD 5205.

The first and second flanges 36, 38 are rigidly connected to the hub 34 and therefore rotate co-axially with the hub. Both flanges 36, 38 have about the same diameter, while the hub 34 has a diameter about half that of either flange, so that the flange-to-hub diameter ratio of the spool 30 is generally about two. Thus, a substantial quantity of trotline 22 (e.g., 250 feet) may be accumulated between the two flanges 36, 38 and around the exterior of the hub 34. The actual diameters of the hub and flanges are not critical, and essentially any diameter may be used so as to accommodate industrial-type trotlines used in deep sea fishing or to accommodate sport-type trotlines generally used on recreational lakes. However, the ratio between hub diameter and flange diameter is important to the convenience and manner of operation of the holder. So, if a significantly larger holder is desired, it will generally be preferred that most dimensions be scaled up in unison; the size and depth—and quantity—of the slots in the first flange (to be described) will usually be adjusted, as appropriate, in accordance with the teachings herein. The hub diameter for a typical holder used by a "weekend fisherman" is about 5 inches, while the flange diameters are about 10 inches, such that the holder has a capacity of about 115 cubic inches of trotline. Such a trotline holder will conveniently hold up to 250 feet of sport-fishing trotline having about fifty drop lines averaging about a foot in length. The drop lines or leaders 26 may be of varying lengths, depending on the depth that the fisherman prefers to suspend the associated hooks 28. Referring specifically to FIG. 2, each drop line 26 is attached to the main line 24, usually with swivels fixed at certain spaced locations along the main line by swivel stops (not shown). Each drop line 26 carries a hook 28 which may vary in size from No. 1/0 to No. 6/0. Suitable materials for a trotline 22 are available from GWB Manufacturing Company of Bowie, Tex., including No. 72 nylon twisted twine for the main line 24 and No. 12 nylon twisted twine for the drop lines 26. A preferred brand of "J" hook is Eagle Claw model No. 254 SSM, No. 1 to No. 6/0. In addition to "J" type hooks, the trotline holder may accommodate a variety of other types of hooks including "C" hooks, "true turn" hooks, etc.

The compact size of the trotline holder 20, combined with its light weight, makes it easy to handle when loaded with trotline. Empty, a trotline holder of polyethylene will typically weight about 1½ pounds; loaded, with a typical 250 foot trotline, the holder will usually weigh about 4½ pounds.

Figure 3:
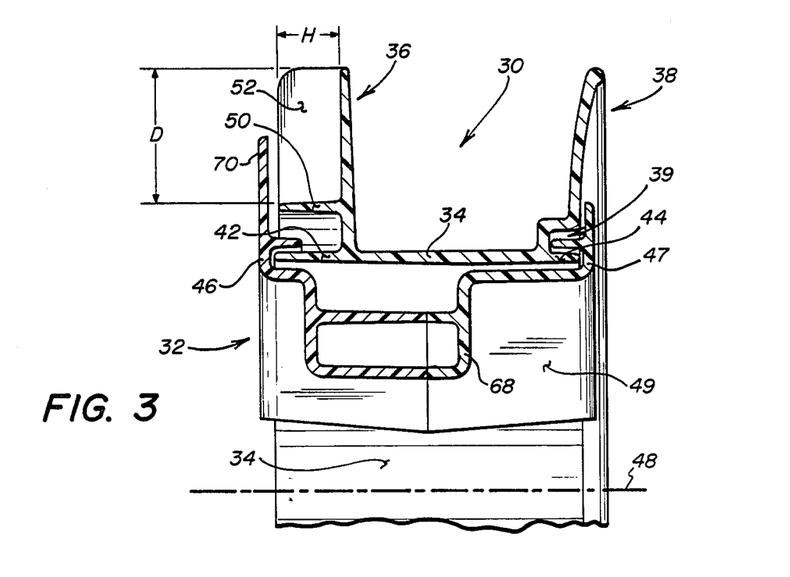
FIG. 3 is a fragmentary cross-sectional view of the trotline holder, taken in a plane through the axis of rotation and represented by the lines 3—3 in FIG. 1.

Referring next to FIGS. 1 and 3, the hollow cylindrical hub 34 is open at both ends and is sufficiently large as to accommodate the hand of an average user. With this construction, the user may insert the fingers of either the left or right hand into the hub (depending on the orientation of the hub), thereby permitting the holder 20 to be used with more or less equal convenience by either a right-handed or left-handed person. The hub 34 between the first and second flanges 36, 38 is about 2½ inches wide.

Mounted within the hub 34 is the handgrip 32, said handgrip having an arcuate track defined by two inwardly facing pieces 46, 47. The inwardly facing pieces 46, 47 have a generally U-shaped cross-section and are held in a fixedly spaced relationship by a body portion 49 of the handgrip. The separation between the track segments 46, 47 is slightly greater than the total width of the hub 34, including the two cylindrical extensions 42, 44. In effect, the cylindrical extensions 42, 44 at the two ends of the hub form rails which are shaped and sized so as to foster sliding contact with the track segments 46, 47. The result is that a person holding the handgrip 32 with one hand will inherently establish the plane in which the hub and its associated flanges will rotate. Therefore, the hub which is supported by the handgrip may be freely rotated about a central axis 48 in either a clockwise or counterclockwise direction.

The first flange or planar member 36 is rigidly attached to the hub 34 at a location where the hub and the first cylindrical extension 42 merge. Mounted on the first flange 36—a short distance outwardly of the cylindrical rail 42—is a short ring 50 which is co-axial with the cylindrical rail and has a diameter slightly larger than that of the cylindrical rail. The ring 50 lies on that side of the first flange 36 which faces away from the second flange 38. Along the outer face of the first flange 36 and extending radially outward from the ring 50 is a serial array of ridges 52; these ridges extend radially outward to the periphery of the first flange. In this embodiment it will be apparent after examining FIG. 1 that the first flange 36, ring 50 and ridges 52 are arranged such that they form twenty-three peripheral and outwardly opening compartments 54. The compartments are positioned around an outer circumferential band of the first flange, and each compartment is adapted for receiving one or more fishhooks—with any plurality of hooks being arranged side by side in a "stacked" fashion.

Figure 4:
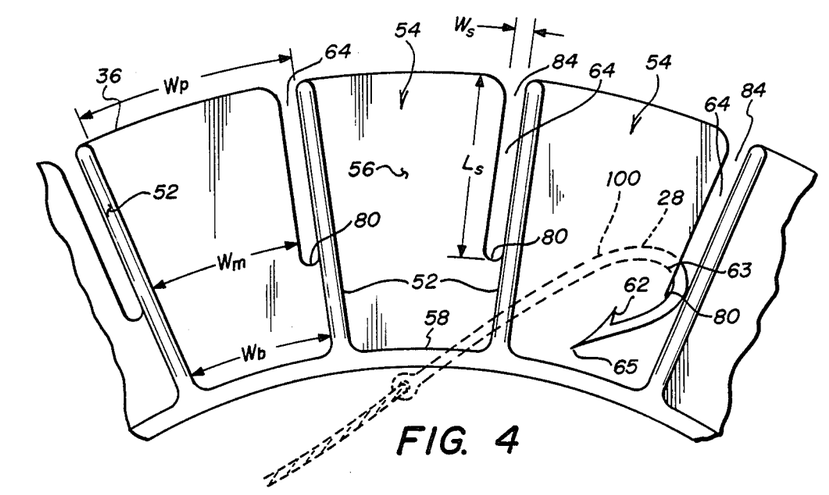
FIG. 4 is an enlarged, fragmentary side view of certain ones of the compartments for holding the point and the barbed part of a fishhook.

Referring additionally to FIG. 4, each of the compartments 54 comprises a bottom wall 56, an end wall 58, and two side walls 52, 52; specifically, the bottom wall is defined by a radial segment of the first flange 36, the end wall is defined by a segment of the ring 50, and the side walls or ridges 52 extend radially outward from the extreme edge of the end wall and along the radial edges of the bottom wall. The combination of the compartment walls 52, 58, 52 aid in precluding a user's hand from being pierced by hooks that are properly stored within a compartment. The compartments 54 are open along the sides, which face outwardly and peripherally so as to facilitate the insertion or removal of hooks while the main line is being wound or unwound with respect to the hub 34. In addition, because the compartments 54 are not totally enclosed, the "action" part of a hook 28 which is held within a compartment may be visually examined without removing a cover or any similar structure of the trotline holder.

Figure 5:
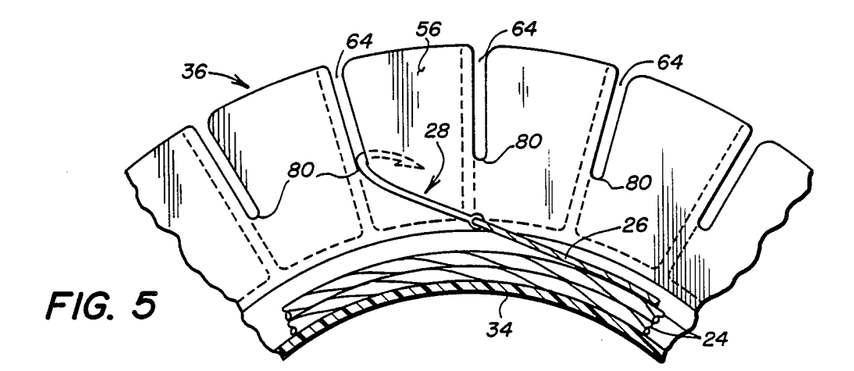
FIG. 5 is an enlarged fragmentary view of certain ones of the bottom walls of the compartments as viewed from the spool interior, showing a portion of the main line wrapped around the hub and a hook engaged in the slot in a bottom wall.

As shown in FIG. 4, the bottom wall 56 of each compartment 54 provides at least one slot 64 of substantially uniform width extending radially inward from the periphery of the first flange 36. While either an angular or curved slot may work, a straight slot 64 is preferred, so that the slots of the uppermost compartments extend in a direction generally perpendicular to the orientation of the main line 24 when it is extended in tension across a lake or body of water (as illustrated in FIG. 2). The configuration of a straight slot 64 tends to cause a drop line attached to a tensioned main line to remain taut while the hook associated with that drop line is being inserted or removed from the slot. As shown in FIG. 5, tension is maintained in the secured drop line 26 so that its hook 28 is tightly held in the associated slot 64, thereby preventing the hook from dropping out of the slot while accumulating or dispensing the trotline 22. Keeping the drop line 26 in tension can also serve to minimize entanglement between the unwound portion of the secured drop line and the wrapped main line 24.

To accommodate 1/0 to 6/0 hooks, the length (i.e., the depth) of the slot 64 in a compartment 54 is preferably about one inch long, while the width of the slot is preferably about ⅛ inch. The length of the slot is designated by the notation Ls and the width of the slot is designated by the notation Ws shown in FIG. 4. It should be apparent that a hook that is inserted into a slot 64 will generally slide down the sides of the slot and rest on the slot bottom 80. Referring to both FIGS. 1 and 4, it will be seen that all of the slot bottoms 80 of the radial slots in the flange 36 represent a loci of points which form a circle. The radius of this circle is preferably about one inch greater than the radius of the hub 34, such that any hook resting on a slot bottom 80 is about one inch above the hub's outer surface. Therefore, a hook 28 suspended in the slot bottom 80 remains a sufficient distance above the hub to facilitate the insertion and removal of the hook from the slot. Additionally, each slot bottom 80 is about ½ inch away from the compartment inner wall 58, such that a size 6/0 Eagle Claw "J" hook resting on the slot bottom is prevented from scraping the inner wall.

The slot 64 may be located centrally of the bottom wall 56 or to either side thereof; the preferred location (as shown in FIG. 4) is adjacent one of the side walls 52, so as to provide maximum clearance for a hook 28 that is to be captured within the associated compartment. The maximum size of a hook which can be held within a given compartment 54 is related to the length (i.e., depth) of the slot 64 and the depth of the compartment, because the compartment is inwardly tapered and its width narrows from the compartment periphery to the inner wall 58. By use of the term "size" it is intended to refer to the distance between the hook's bight 63 and its point 65. With this in mind, it will be appreciated that an inversely proportional relationship exists between the length of the slot 64 and the size of the hook which may be accommodated within the compartment. As the length of the slot 64 increases, there is a decrease in the size of the hook which the tapered compartment may accommodate without causing a hook to engage (or interfere with) the opposite side wall 52 and/or the end wall 58 of the compartment.

A preferable peripheral width of the tapered compartment 54 is about 1¼ inches as defined by an arc extending circumferentially from the entrance of the slot 84 to the opposite side wall 52. The peripheral or outer width is indicated by the notation Wp in FIG. 4. The width of the compartment near its middle (designated in the figure by the notation Wm) is significantly less than the outer width Wp; a preferable middle width Wm is just less than one inch and is defined by a circular arc extending from the slot bottom 80 to the opposite side wall 52. Such a compartment 54 may accommodate a hook as large as ¾ inch (from bight to point). As a result, a size 6/0 Eagle Claw "J" hook may be easily inserted into a compartment 54 and held there by the slot 64 without the hook point 65 scraping against the opposite side wall 52 or inner wall 58.

Referring again to FIG. 3, the compartment side wall 52 is generally rectangular and at least ½ inch high; it is preferably about ¾ inch high and 1½ inches long (i.e., deep) as defined by the dimensions H and D, respectively. The side wall 52 aids in preventing any one of a large number of hooks contained within a compartment 54 from entangling other hooks in adjacent compartments, and also serves to maintain a safe distance between the user's hand (which hand is supporting the trotline holder) and the hook points and barbs.

Figure 6:
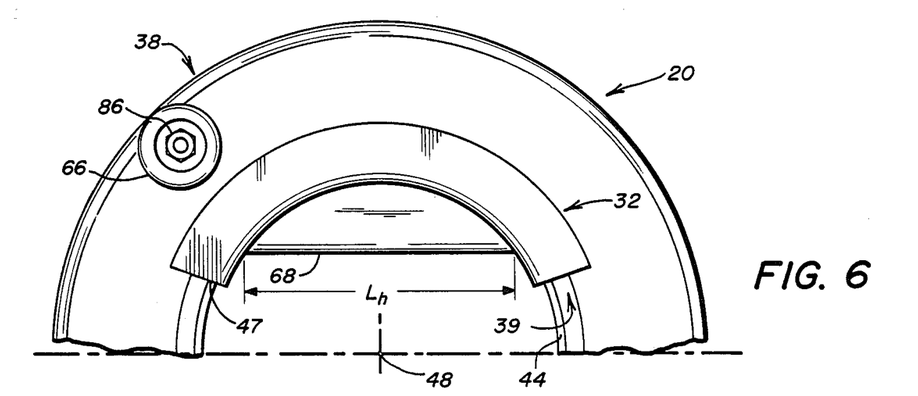
FIG. 6 is a partial side elevational view of the holder—showing the top half of the second flange, and showing a knob used for rotating the spool about the internally mounted handgrip, with the handgrip being shown in an upper position such as it would be in when it is supported by the user.

Referring still to FIG. 3 and additionally to FIG. 6, the first and second flanges 36, 38 are located at opposite ends of the hub 34. The second flange 38 is rigidly attached to the hub 34 at a location where the hub 34 and the second cylindrical extension 42 merge. The inner portion of the second flange 38 has an offset portion which provides a circular gap 39 of about ¼ inch, which gap functions as the guide for the arcuate track segment 47 of the handgrip 32 to slide over the second rail 44. A knob 66 is pivotally attached to the outer face of the second flange 38, so that it might be grasped by one hand of the user in order that the spool 30 could be rotated with respect to the fixed handgrip 32. In order to make it easier to turn the spool 30 about the handgrip 32, the knob is attached at a location as far away as practicable from the hub axis 48.

The handgrip 32 is mounted within the cylindrical hub 34 and is adapted for rotatably supporting the spool 30; the handgrip is preferably molded from two pieces that are joined together in such a manner that the hub 34 is permanently captured between the two pieces. Such a two-piece handgrip construction may be assembled using any of a variety of joining methods, including the use of screws, fasteners or adhesives; however, the preferred joining method is ultrasonic welding. The handgrip 32 is preferably formed of a low-friction plastic material so as to foster sliding movement between the handgrip and the spool 30. A suitable material is ABS plastic which is available from Borg-Warner Corporation of Parkersburg, W. Va. under the trademark name of Cycolac.

The handgrip 32 has a gripping portion 68 which extends transversely of the cylindrical hub 34, so that a person's fingers may be readily inserted into the hub in order to grasp the textured surface of the gripping portion. The user's fingers should be inserted from the same side of the hub as the compartments are mounted on; the thumb is left outside the hub so that it may be used to apply a selective braking force on the rotatable spool. The grip 68 is preferably size with a width (in a direction parallel to axis 48) of about two inches and a length Lh of about four inches, so that it may be easily gripped by the average user's hand. To encourage balance and comfort while the user is supporting the trotline holder 20, the gripping portion 68 is positioned nearer the first flange 36 than the opposite flange 38. One reason for this preferred configuration is so that the stronger part of a person's hand (near the wrist) generally will be in a closer supporting relation to the heavy side of the holder 20.

Referring still to the handgrip 32, the gripping portion 68 is rigidly affixed to the handgrip body 49. Two arcuate track segments 46, 47 are located on the body 49 in a spaced and confronting relationship for guiding the spool rails 42, 44 circularly about the axis 48.

The handgrip 32 has a planar element 70 which functions as a protective shield, and, like the first and second flanges 36, 38, the element 70 rotates about the hub's central axis 48 and extends in the same direction as the first and second flanges. With this in mind, it is convenient to refer to the element 70 as a third flange. Referring still to FIG. 1 and additionally to FIG. 7, the third flange 70 is attached to the upper portion of the handgrip 32 and lies in a plane generally parallel to and adjacent the first flange 36. It is preferred that the third flange 70 be integrally formed as part of the handgrip 32 so as to be permanently fixed for rotation therewith; however, it is conceivable that the third flange could be attached to the handgrip using a suitable fastener, or adhesive or the like. As measured from its right edge to its left edge, the flange 70 preferably constitutes a segment of an arc extending for about 140 degrees; its width is established by the difference between two radii, both of which are measured from the central axis 48 of the hub 34. The inner radius of the flange 70 is about three inches, and the outer radius is about 4½ inches. In this particular embodiment, the outer radius of the third flange 70 is about one inch greater than that of the hub 34.

Figure 7:
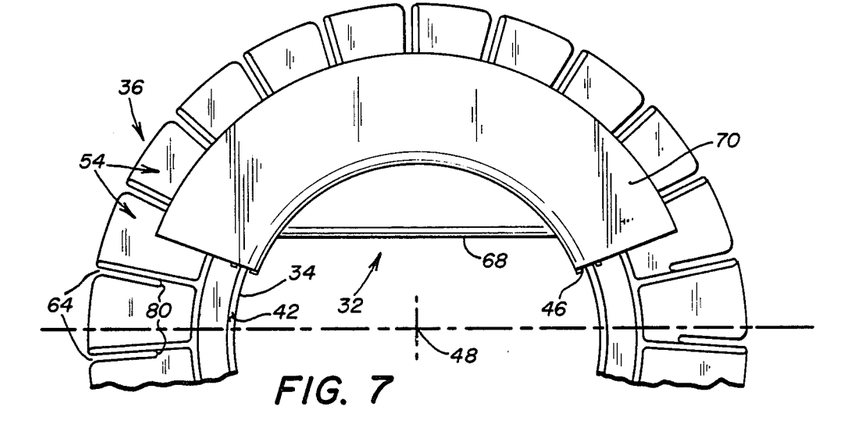
FIG. 7 is a partial side elevational view of the holder—showing the top half of the first flange and showing the side of the handgrip which provides a third flange for protecting the user's hand from any hooks that are properly stored within the illustrated compartments.

The third flange 70 extends outwardly from the central axis 48 of the cylindrical hub 34 for a distance which is greater than the distance from the central axis of the hub to the bottom 80 of a radial slot 64. Thus, the outer edge of the third flange 70 preferably overlaps the slot bottoms 80 in the adjacent compartments 54, so as to cover the lower portion of the compartments and any points 65 and barbs 62 of hooks contained therein. In this regard it should be clear that the third flange can act as a shield between a user's hand which is grasping the handgrip and any hooks contained within the compartments 54. The length of the third flange 70 exceeds the span of the gripping portion 68, thereby ensuring that a digit which is properly placed adjacent the gripping portion will not be able to contact a hook. Also the flange 70 will routinely cover about eight or nine of the twenty-three compartments 54 at any given time. The remaining compartments 54 are left uncovered so that the condition of the hooks can be easily checked to ensure there is no residual bait left on a hook—bait that might rot (and stink) or cause corrosion, etc. The open sides of the compartments 54 foster easy cleaning with a stream of water from a faucet, hose or similar pressurized source. Also, a significant safety factor with this design is that the points of the hooks may be examined without touching the hooks.

Figure 8:
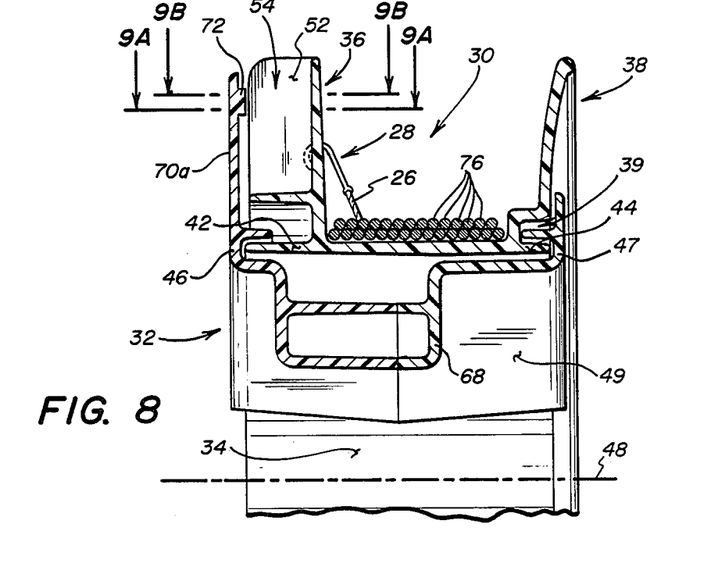
FIG. 8 is a fragmentary, cross-sectional view of another embodiment of the invention showing the top half of a holder, with the third flange having a protuberance through which a braking force may be imposed on the side walls of the compartments.
Figure 9A:
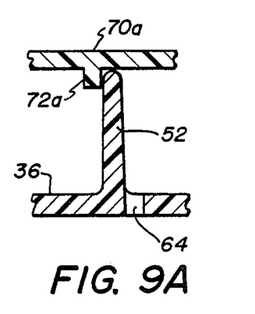
FIG. 9A is a top cross-sectional view of one embodiment of the invention which shows the third flange having a protuberance with a box-like cross-section (with sharp corners) for positively preventing rotation of the spool.
Figure 9B:
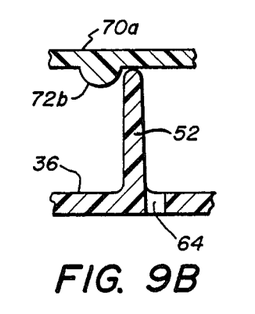
FIG. 9B is a top cross-sectional view of another embodiment of the invention which shows the third flange having a ramp-like protuberance for permitting controlled rotation of the spool.

Referring now to FIG. 8, a modification of the third flange is illustrated and given the reference numeral 70a. It is within the scope of this invention to configure the third flange 70a so that it may be used as a means for manually imposing a braking force on the spool 30 with only one hand, so as to inhibit rotation of the spool and to leave the opposite hand free to secure a drop line 26 (and insert or remove the hook 28 attached thereto). In one embodiment of the trotline holder wherein the first and second flanges have a radius of about 4¾ inches, the third flange 70a extends radially outward from the central axis of the hub to near the outermost edges of a plurality of side walls 52 (e.g., for about 4½ inches). The flange 70a is preferably made of a semi-flexible material, permitting it to be manually forced or flexed inwardly toward the adjacent compartments. The third flange 70a has an irregularity or protuberance 72 on the side facing the compartments 54, and the width of the protuberance is appreciably less than the width of a compartment at a spot immediately opposite the protuberance. A preferred width for the protuberance is about ¾ inch when the compartment width immediately opposite the protuberance is about one inch. The third flange 70a may be flexed inwardly in order to cause the protuberance 72 to drag along the adjacent edges of side walls 52 and/or to enter an adjacent compartment 54, where the protuberance will then butt against the side wall of a compartment and effectively inhibit rotation of the compartment with respect to the handgrip 32. Of course, the protuberance 72 is positioned radially outward on the flange 70a for a distance that is sufficient to ensure that the protuberance can enter the space between any two adjacent side walls 52 without contacting the inner wall 58. The shape of the protuberance 72 may be box-like with distinct, sharp edges having an included angle of about 90 degrees; or it may have gently rounded edges that are more nearly ramp-like. These two exemplary shapes 72a, 72b for the protuberance are shown in FIGS. 9A and 9B, respectively. Other shapes for the protuberance 72 may also be used, depending upon the type of braking force that a designer wishes to impose on the side walls 52 when the flange 70a is flexed by a user's hand or thumb toward the adjacent compartments 54. With this in mind, it is obvious that a box-like protuberance 72a positively prevents relative rotation of the spool 30 with respect to the third flange 70a, while a ramp-like protuberance 72b permits controlled relative rotation of the spool with respect to the third flange.

Figure 10:
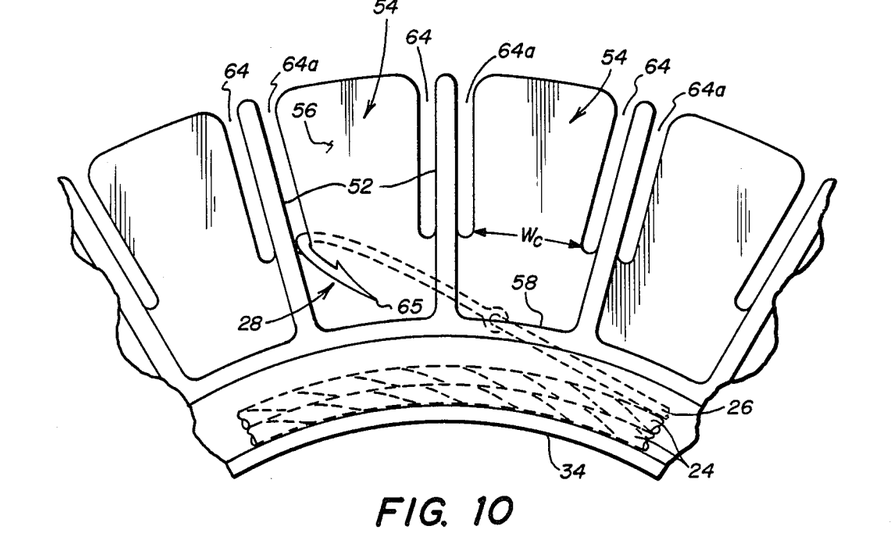
FIG. 10 is an enlarged fragmentary side view of another embodiment showing two slots at opposite sides of a compartment, such that a major portion of the bottom wall is cantilevered, so as to facilitate the easy release of hooks accumulated within a compartment.

Referring next to FIG. 10, another embodiment of the invention is illustrated showing the bottom wall 56a with both a right slot 64 and a left slot 64a. Two slots extending radially inward are provided at opposite sides of a compartment such that a major portion of the bottom wall 56a is cantilevered. Each of the two slots is preferably located adjacent a respective one of the two side walls. In this embodiment both slots 64, 64a have the same width and are about one inch long. The base of the cantilevered portion of the bottom wall (designated by Wc) is about one inch wide, such that the length-to-width ratio of the cantilevered portion is about one. Additionally, the bottom wall 56a of each compartment is made of a semi-flexible polyethylene material with a flexural modulus of 160,000 psi (as determined using test method D79). In view of this, it will be appreciated that the cantilevered configuration, when combined with the inherent flexural modulus of the bottom wall 56a, allows the cantilevered portion of the bottom wall to be flexed transversely for a small distance so as to foster the easy release of hooks 28 from a respective slot 64, 64a while main line is being unwound from the hub.

Another feature of the dual-slot configuration is that it fosters ease of use by both right-handed and left-handed users. Because of the dual-slot configuration, trotline 22 can be advantageously accumulated such that it first contacts the top of the hub 34 and is thereafter wrapped circularly around the hub. (As will be explained later, it is easier to accumulate a trotline so that it first contacts the top as opposed to the bottom of the hub.) When trotline 22 is accumulated by a right-handed user, hooks 28 are inserted into the right slot 64 of a bottom wall 56a; and when trotline is accumulated by a left-handed user, hooks 28 are inserted in the left slot 64a of a bottom wall 56a.

The trotline holder 20 is advantageously formed in three separate, molded pieces, including the spool 30 and both sections of the handgrip 32; the knob 66, of course, constitutes a fourth piece. The holder 20 could be formed from more than three pieces, but the process would be more complicated, requiring additional manufacturing steps and assembly, and would unnecessarily increase production costs. In assembly, both sections of the handgrip 32 are mounted within the spool 30 such that each segment of the arcuate track 46, 47 is positioned over its respective rails 42, 44. The handgrip halves are ultrasonically welded together so that the handgrip 32 is permanently captured within the spool 30. As shown in FIG. 6, the rotatable knob 66 is positively attached to the second flange 38 with a corrosion- and/or rust-resistant fastener 86, such as a stainless steel screw and mating nut or the like.

In use, a holder 20 as illustrated in FIG. 1 may be operated by either left-handed or right-handed users. A right-handed user typically supports the holder 20 with the left hand and rotates the spool 30 by turning the knob 66 with the right hand, while a left-handed user would reverse that arrangement. In view of the fact that probably 95% of the people who could use the holder will be right-handed, the procedure described herein will be based upon use by a right-handed person. It will be assumed that the person who is fishing has already pre-rigged a trotline 22 with the desired quantity of drop lines 26 and hooks 28, so that a finished trotline is ready to be loaded on the holder 20. It will also be assumed that the trotline 22 is fully extended, and that a first end 94 of the main line 24 is tied to a distant tree or other anchoring spot, so that the main line can be held in tension during the loading process.

The initial step in loading a holder 20 requires that a person fasten one end 96 of the trotline 22 to the hub 34, typically by tying a slip-knot in the main line 24 and wrapping it around the hub. Next, the person picks up the holder 20 and supports it by inserting the fingers of the left hand into the hub 34 and then grasps the gripping portion 68. Then the knob 66 is grasped with the right hand, and is rotated so as to turn the spool 30 about the static handgrip 32 so as to begin accumulating trotline 22 around the hub 34. The trotline 22 is advantageously accumulated so that it first contacts the hub near the top part thereof, and the trotline is thereafter wrapped circularly around the hub. The initial portion of the main line 24 is progressively accumulated until the first drop line 26 is hanging about six inches away from the holder 20. At this time the user should inhibit rotation of the spool 30 so that the first drop line 26 may be secured. In the embodiment shown in FIG. 1, rotation of the spool 30 may be inhibited by using the thumb of the left hand which, of course, is still supporting the holder 20. This is accomplished by placing the thumb against one of the compartment side walls 52 which is at the top of the holder. The side walls 52 are located sufficiently close to the handgrip 32 as to be engageable by the thumb of an average person who is holding the handgrip in the palm of his or her hand.

Another means of inhibiting rotation of the spool 30 is illustrated in the embodiment shown in FIG. 8. In this embodiment the user may inhibit rotation of the spool 30 simply by flexing the third flange 70a (or a portion thereof) inwardly toward the adjacent compartments 54, such that the protuberance 72 engages one of the side walls 52 to create spatial interference therewith. Using either means, rotation of the spool 30 can be effectively impeded so as to leave the user's right hand free to reach forward and grasp the eye of the hook associated with the first drop line. Once the hook eye 98 is securely held between the user's fingers, the hook 28 is pulled backward over the top of the hub 34 toward the nearest radial slot 64 that will ensure that the drop line 26 is maintained in tension. This may mean that a "forward" slot is ignored, even though it is nearer than a "rearward" slot—if to engage the "forward" slot would necessarily introduce some slack into the drop line 26. Obviously, a slack drop line 26 would cause a "looseness" in the hook-mounting arrangement which may allow the hook 28 to prematurely fall out of the slot 64 while the trotline 22 is being accumulated or dispensed. Expressed in other words, each hook 28 can be tightly held in its associated slot 64 by virtue of the simple step of assigning priority to drop-line tension rather than main-line tension, if the two lines cannot be equally tensioned. It is also worth mentioning that this technique for accumulating a trotline 22 on the holder 20 has an inherent flexibility, so that no particular precision is required when the fisherman is initially installing the staging 26 (i.e., the drop lines, etc.) on his main line 24. Thus, the holder 20 can accommodate a trotline 22 and keep the hooks 28 tightly secured, regardless of how the drop lines 26 were positioned at the time they were being fixedly secured to the main line 24.

With the first drop line 26 still held in tension and the hook 28 held over the selected slot, the fisherman should orient the hook such that it may be properly inserted into the slot 64. With the fingers tightly grasping the hook eye 98, the user's wrist is turned such that the hook point 65 is directed downward and away from the user. The hook bight 63 should be inserted into the selected slot 64 so that the point and the barb 62 are captured in a compartment 54, and the hook eye 98 and hook shank 100 remain interiorly of the first flange 36. The hook 28 will automatically slide down the slot 64—as long as the drop line is in tension—so that it rests against the bottom of the slot.

After the first drop line 26 and its hook 28 are secured, the user must return his or her right hand to the knob 66 in order to again be in position to turn the spool 30. In the embodiment shown in FIG. 1, the braking digit of a person's left hand is moved away from the compartment side wall 52, and the digit is allowed to rest casually against the outer face of the third flange 70. In the embodiment shown in FIG. 8, inward pressure by the left hand is removed from the outer face of the third flange 70a, allowing it to return to its relaxed position; this permits the protuberance 72 to back away from (or disengage from) the side walls 52, and allows the spool 30 to again be rotated freely about the handgrip 32.

To continue the loading process, the spool is turned with the right hand and accumulation of trotline 22 is resumed until the second drop line comes close enough so that it may be handled in the same manner as the first drop line. Assuming that the length of the drop line is about one foot, accumulation of main line 24 is halted when the swivel for the second drop line is about six inches from the holder 20. The same loading procedure as described above should be followed for the remaining drop lines 26 and their associated hooks 28. Once all drop lines are loaded in the holder 20, the first end 94 of the main line 24 is unfastened from its original anchoring point, and the remaining portion of the main line is wound around the hub 34. A knot is tied at the end 94 and this knot is securely inserted into the nearest slot 64, so that all of the trotline will be collected and held for easy transportation to a fishing site.

To set out the trotline 22 in some body of water, the first end 94 must be secured to an anchor such as a tree, or rock or the like. The user will move away from the anchoring point, allowing the line 22 to unreel off the spool 30. The setting-out process should be performed at a rate which is slow enough so as to allow the plurality of captured hooks 28 to sequentially disengage from the compartment slots 64 without any manipulation or manual contact. In this sense, removal of the hooks from the trotline holder 20 may be aptly described as "automatic," in that it occurs naturally as a result of the judicious placement of the slots 64 and their radial orientation—and translation of the holder away from an anchored end 94 at a moderate speed. After the trotline 22 is unreeled, it will look something like the extended trotline illustrated in FIG. 2. The final step in setting out the trotline 22 is to fasten the second end 96 of the trotline main line 24 to a remote anchoring point so as to hold the trotline in suspension across or along the body of water 90. The procedure for retrieving the trotline 22 is essentially the same as the loading procedure described above.

Figure 11:
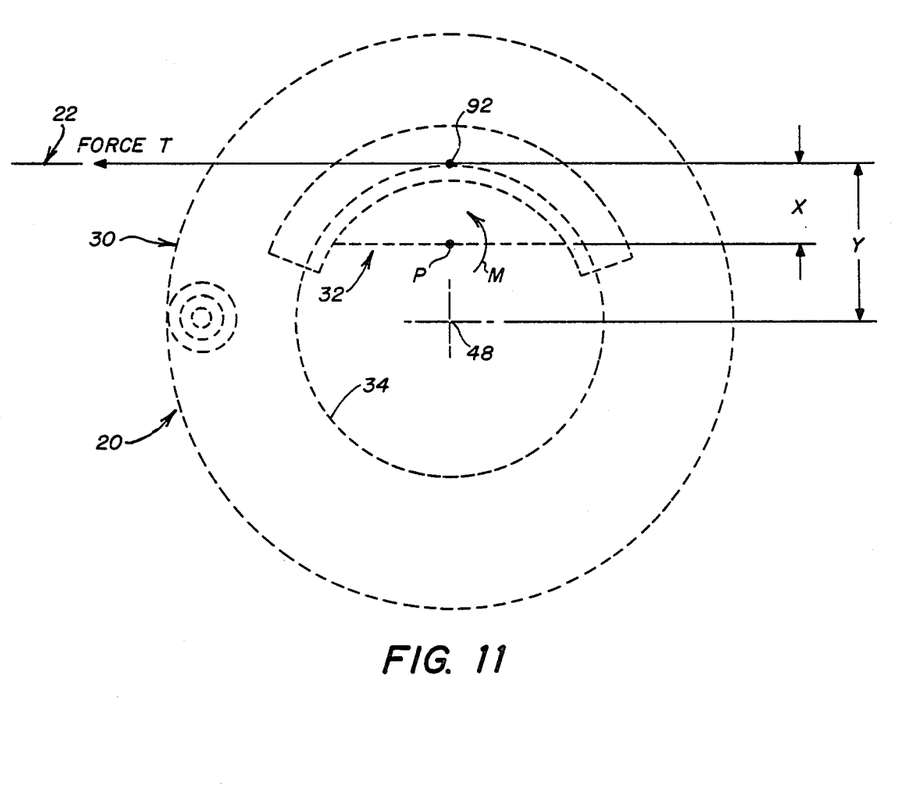
FIG. 11 is a force diagram showing the tension force and moment which typically act on the holder (because of tension in the trotline) when the user is inhibiting rotation of the spool.

Referring now to FIG. 11, a force diagram of a holder 20 is shown, said holder being well illustrated in FIG. 7. The tension force T and torque M typically act on the holder 20 when the user is inhibiting rotation of the spool 30 during the process of setting out or reclaiming the trotline 22. The tension force T, of course, is caused by pulling the trotline 22 away from the holder in a generally horizonatal direction, and the tension force T acts on the tangent point 92 of the hub 34. The term "tangent point" naturally refers to the point at which the extended trotline 22 first contacts the spool hub 34. The torque M is caused by the tension force T acting on the handgrip 32 about the moment arm X. In this regard, it is being assumed that all of the supporting force provided by the user's left hand is being concentrated at point P on the handgrip 32. Having defined point P and tangent point 92, it will be apparent that the dimension X is the distance between these two points.

A careful examination of FIG. 11 will reveal that the handgrip 32 is displaced from the central axis 48 to a point significantly away from the central axis—and toward the hub tangent point 92. Keeping this in mind, it will be appreciated that the handgrip 32 is displaced from axis 48, so that the moment arm X is appreciably shorter than the distance Y which is defined as the distance between the tangent point 92 and axis 48. Indeed, it is preferred that the distance X be about one-half the distance Y. Thus, when the user inhibits rotation of the spool 30, the shorter moment arm X reduces the torque which tends to rotate the spool in the direction of the extended trotline 22, with the result that the reduced torque deceases the strain experienced by the wrist of the person who is supporting the holder 20.

In review, it may be said that the holder described herein provides the best of all possible features of handheld trotline holders, in that it provides open-top compartments 54 which surround or "cradle" stored hooks (so as to keep them where their points and barbs are visible), but they are so sheltered as to pose no threat to the prudent fisherman. Those same compartments are sufficiently unobstructed that a jet of water can be directed exactly where it is needed to clean a dirty hook—after the fishing trip is over. In the upper region of the holder 20, where the digits of a hand are normally placed, a shield 70 is provided to temporarily block off the lower portion of the compartments 54—so that the benefits of normally open compartments do not present an untoward safety hazard. During rotation of the first flange 36, those compartments that are temporarily on top of the holder are not totally covered—at least in one embodiment; a small structural part of even a covered compartment is left exposed (outside the spatial limits of the third flange), so that a radial wall of a compartment may be engaged by a person's digit to temporarily stop spool rotation when appropriate. In another embodiment an inwardly facing protuberance 72 on a flexible flange 70a may be used to bear against a radial wall 52 to control rotation of the spool 30 with respect to the handgrip 32; or a flexible "trigger" or tongue (formed by a cantilevered element) may be mounted on a rigid flange in order to accomplish the same task. Of the disclosed techniques for inhibiting rotation, the one involving direct contact with one of a person's digits (typically the thumb) may be said to be favored—because it offers much more sensitivity with regard to the tension that is being established in the main line as line is being paid out. And if too much tension is sensed by a digit, the person will be in a better condition to react more quickly so as to deal with the condition that is causing the excessive tension. But, regardless of which of the designs is employed, the spool 30 may be alternately rotated so as to accumulate main line—or fixedly held so as to permit a fresh drop line to be handled.

While only certain preferred embodiments of the invention have been disclosed in detail herein, it will be apparent to those skilled in the art that modifications can be made without departing from the spirit of the invention. For example, the hub width can be made wider so as to increase the capacity of the holder to store accumulated trotline. Also, the spool diameter may be increased beyond that shown in the drawing, resulting in a proportional increase in the spool circumference and thereby enlarging the compartments and/or allowing additional compartments to be carried by the first flange. Additionally, the circumference and radius of the third flange can be increased to cover more than eight or nine compartments and to cover a larger portion of each compartment. Thus, any specific structure shown herein is intended to be exemplary and is not meant to be limiting, except as described in the claims appended hereto.

What is claimed is:

1. A hand-held trotline holder, comprising:
   (a) a spool having first and second generally parallel flanges with a hollow cylindrical hub therebetween, and the diameters of the two flanges being relatively large in comparison with the diameter of the hub, such that a substantial quantity of trotline may be accumulated between the flanges and around the exterior of the hub;
   (b) a short cylindrical member constituting a ring which is co-axial with the spool hub and lying on that side of the first flange which is away from said second flange;
   (c) a plurality of peripheral and outwardly opening compartments, each of the compartments comprising a bottom wall, an end wall and two side walls, said bottom wall being defined by a radial segment of the first flange, said end wall being defined by a segment of the ring, and said side walls extending radially outward from the extreme edges of the end wall and along the radial edges of the bottom wall, and said compartments being otherwise open and being adapted to receive hooks of the trotline within radial slots that extend to the outer boundaries of said compartments, whereby the barb and point of a hook which is held within one of said compartments may be visually examined for both structural condition and cleanliness without removing any structure of said trotline holder; and
   (d) a handgrip mounted within the cylindrical hub and being rotatable about the central axis of said hub, and said handgrip having a portion which extends transversely of the cylindrical hub so that a person may insert the fingers of a hand into the cylindrical hub and grasp said transverse portion.

2. The trotline holder as claimed in claim 1 wherein said side walls are generally rectangular in shape, and the height of said side walls is at least one-half inch, whereby hooks captured in the slot of a bottom wall are maintained at a significant distance from the outer edges of the side walls, and whereby the risk of contact between a user's fingers and hook points or barbs is reduced.

3. The trotline holder as claimed in claim 1 wherein the diameter of the cylindrical hub is about 5 inches, and the length of the transverse portion of the handgrip is about 4 inches.

4. The trotline holder as claimed in claim 1 wherein the diameters of both the first and second flanges are about 10 inches, and the diameter of the hub is about 5 inches, whereby a substantial amount of trotline may be wound around said cylindrical hub and captured between the two flanges.

5. The trotline holder as claimed in claim 1 wherein the diameter of the first flange is about 10 inches, and wherein there are at least 23 compartments positioned around an outer circumferential band of said first flange, and wherein each of the compartments has an outer opening of about 1¼ inches.

6. The trotline holder as claimed in claim 1 wherein the hub radius is about 2½ inches, and wherein the loci of all points on the slot bottoms form a circle having a radius of about 3½ inches, whereby a hook suspended in the bottom of a slot is about one inch from the hub periphery.

7. The trotline holder as claimed in claim 1 wherein the side walls of each compartment are of a substantially uniform height and they have a height of about ¾ inch, such that they form a significant spatial obstacle and minimize the risk of contact between the user's hand and a point or barb on the stored fish hooks.

8. The trotline holder as claimed in claim 1 wherein said bottom wall has at least one straight slot of substantially uniform width extending radially inward from the periphery of said first flange, whereby said straight slot extends in a direction generally perpendicular to the orientation of said main line when the main line is being extended across a body of water, and whereby a drop line having a hook attached thereto may be maintained in tension while the hook is being inserted into or removed from a slot.

9. The trotline holder as claimed in claim 1 wherein said compartments are tapered and have a middle width of about 1 inch as defined by a circular arc extending from the bottom of a slot to the opposite side wall, whereby a hook having a width of about ¾ inch between the bight and the point may be inserted into a compartment and held there by the slot without the hook point scraping against an opposite side wall.

10. The trotline holder as claimed in claim 1 wherein there are at least two radial slots in each of the compartments.

11. The trotline holder as claimed in claim 10 wherein there are two radial slots in each compartment and they have approximately the same width and length, and wherein each of the two slots is located adjacent a respective one of the two side walls.

12. The trotline holder as claimed in claim 11 wherein the outer width of the respective compartments is about 1¼ inches, and the two slots are about one inch long, such that a major portion of the bottom wall is cantilevered as a result of the two spaced slots which extend radially inward from the outer edge of the flange.

13. The trotline holder as claimed in claim 12 wherein the material of each compartment bottom wall has a flexural modulus of 160,000 psi, and the bottom wall is configured so as to have a flexibility which will foster the easy release of a hook from a respective slot when the trotline is being pulled off the hub.

14. The trotline holder as claimed in claim 1 and further including a third flange connected to the handgrip and extending outwardly from the handgrip for a distance that is sufficient to overlap at least the inner portion of those compartments that are adjacent the handgrip at any one time, whereby a person's hand which is gripping said handgrip will not likely interfere with any hooks that are accumulated in the plurality of compartments.

15. The trotline holder as claimed in claim 14 wherein said third flange is integrally formed as a part of the handgrip so as to be permanently fixed for rotation therewith.

16. The trotline holder as claimed in claim 14 wherein said third flange extends outwardly from the central axis of the cylindrical hub for a distance which is greater than the distance from the hub's central axis to the bottom of the radial slots, such that at least a portion of the third flange overlays the bottoms of the radial slots.

17. The trotline holder as claimed in claim 14 wherein said third flange covers only certain ones of the plurality of compartment openings at any given time, thereby leaving other compartment openings uncovered so as to facilitate the inspection and any necessary cleaning of hooks without removing any structural part of the holder.

18. The trotline holder as claimed in claim 17 wherein there are a total of about 23 compartments for holding hooks and wherein the third flange covers only about 8 of said compartments at any given time.

19. The trotline holder as claimed in claim 14 and further including means for manually imposing a braking force with one hand on one of the side walls so as to inhibit rotation of the spool while a drop line is being secured and the hook attached to that drop line is being inserted or removed with the other hand.

20. The trotline holder as claimed in claim 14 wherein said third flange is formed of a semi-flexible material having at least one protuberance on the side facing the compartments, and wherein said third flange extends radially outward to near the outermost edges of a plurality of side walls, whereby said third flange may be slightly deflected in order to cause the protuberance to bear against the side wall of an adjacent compartment.

21. The trotline holder as claimed in claim 20 wherein said third flange is susceptible of being flexed toward the adjacent compartments so as to cause the at least one protuberance to at least partially enter the space between two side walls and thereby positively prevent relative rotation of said spool with respect to the third flange.

22. The hand-held trotline holder as claimed in claim 20 wherein the width of the protuberance is appreciably less than the width of the compartment at a spot immediately adjacent said protuberance, whereby the third flange may be flexed inwardly by a distance which is sufficient to cause a protuberance to enter an adjacent compartment so as to inhibit rotation of said compartment with respect to the handgrip.

23. The trotline holder as claimed in claim 20 wherein said protuberance has rounded edges which permit the protuberance to function like a ramp and to permit controlled relative rotation between the third flange and those compartments immediately adjacent the protuberance.

* * * * *